US 12,146,611 B1

United States Patent
Gretz

(10) Patent No.: US 12,146,611 B1
(45) Date of Patent: Nov. 19, 2024

(54) ADJUSTABLE SLIDER BAR FOR MOUNTING AN ELECTRICAL BOX

(71) Applicant: Arlington Industries, Inc., Scranton, PA (US)

(72) Inventor: Thomas J. Gretz, Delray Beach, FL (US)

(73) Assignee: ARLINGTON INDUSTRIES, INC., Scranton, PA (US)

( * ) Notice: Subject to any disclaimer, the term of this patent is extended or adjusted under 35 U.S.C. 154(b) by 427 days.

(21) Appl. No.: 17/581,942

(22) Filed: Jan. 23, 2022

Related U.S. Application Data

(60) Provisional application No. 63/143,352, filed on Jan. 29, 2021.

(51) Int. Cl.
*F16M 13/02* (2006.01)
*H02G 3/12* (2006.01)

(52) U.S. Cl.
CPC ............ *F16M 13/02* (2013.01); *H02G 3/121* (2013.01)

(58) Field of Classification Search
CPC ...................................... F16M 13/02
USPC .......................................... 174/50
See application file for complete search history.

(56) References Cited

U.S. PATENT DOCUMENTS

| | | | |
|---|---|---|---|
| 4,180,226 A | 12/1979 | Matte | |
| 4,967,990 A * | 11/1990 | Rinderer | H02G 3/125 220/3.9 |
| 5,114,105 A | 5/1992 | Young | |
| 6,666,419 B1 | 12/2003 | Vrame | |
| 7,036,782 B2 | 5/2006 | Cheatham et al. | |
| 7,173,186 B1 * | 2/2007 | Hageman | H02G 3/125 174/57 |
| 7,572,977 B2 | 8/2009 | Gorman | |
| 8,686,287 B1 * | 4/2014 | Gretz | H02G 3/123 439/535 |
| 9,048,644 B1 * | 6/2015 | Gretz | H02G 3/123 |
| 9,397,491 B2 | 7/2016 | Birli et al. | |
| 2013/0200243 A1 * | 8/2013 | Mischer | B60N 2/0727 248/429 |
| 2017/0093140 A1 * | 3/2017 | Nikayin | H02G 3/125 |
| 2018/0062365 A1 * | 3/2018 | Kellerman | H02G 3/12 |

* cited by examiner

*Primary Examiner* — Stanley Tso

(57) ABSTRACT

A slider bar for mounting one or more electrical boxes of non-standard stud spacing. The slider bar is adjustable to ease the positioning and installation of one or multiple boxes where they are needed in the stud cavity. The slider bar provides a stable mounting platform between the studs and eliminates the time-consuming need to modify the non-standard stud cavity. The slider bar includes pre-formed holes in one or more of the bars to facilitate easy attachment of electrical boxes. An interlocking tab stop prevents accidental disassembly. Bending guides on bracket ends assure proper positioning on studs. The slider bar may be used to mount one or more plastic boxes or metal boxes rated for non-metallic cable or metal clad cables.

6 Claims, 9 Drawing Sheets

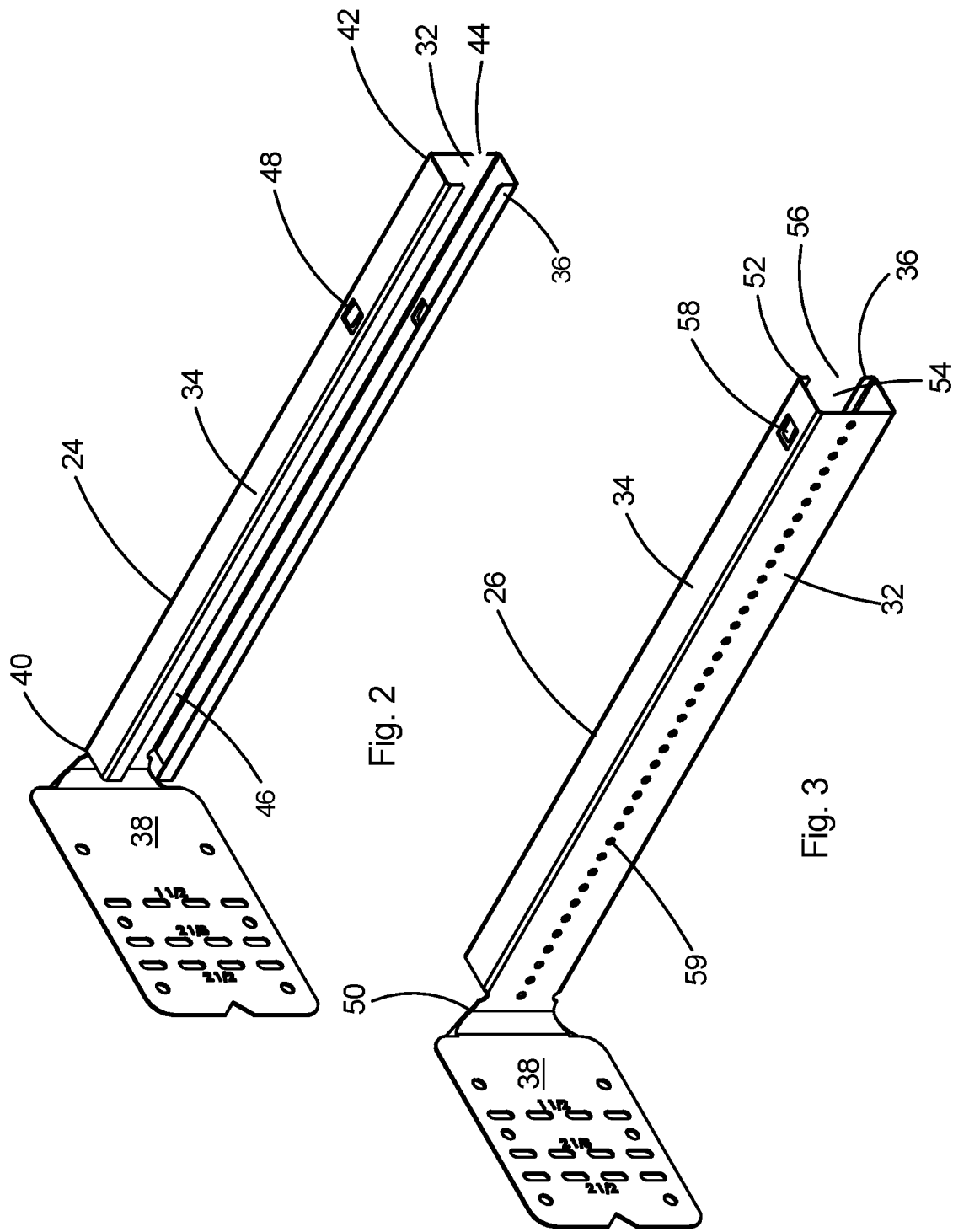

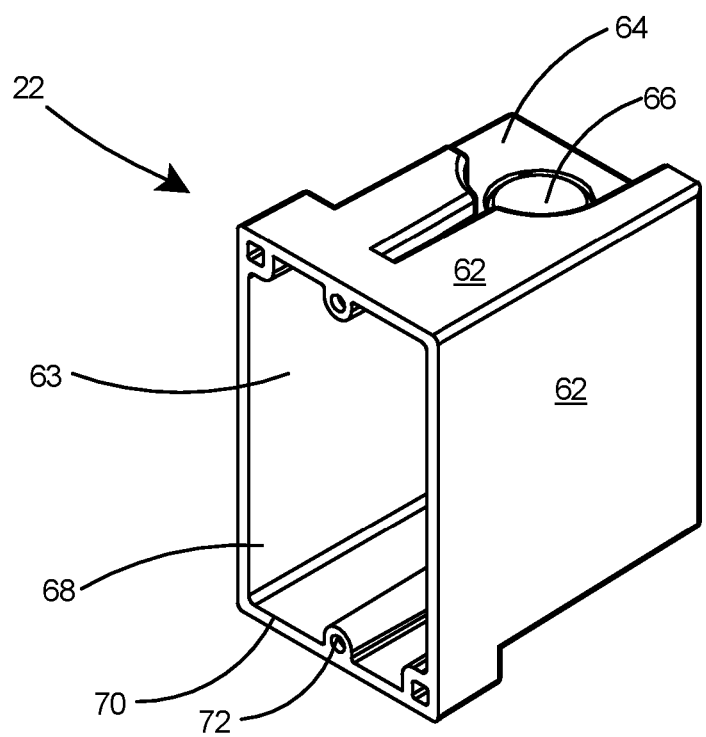
Fig. 4
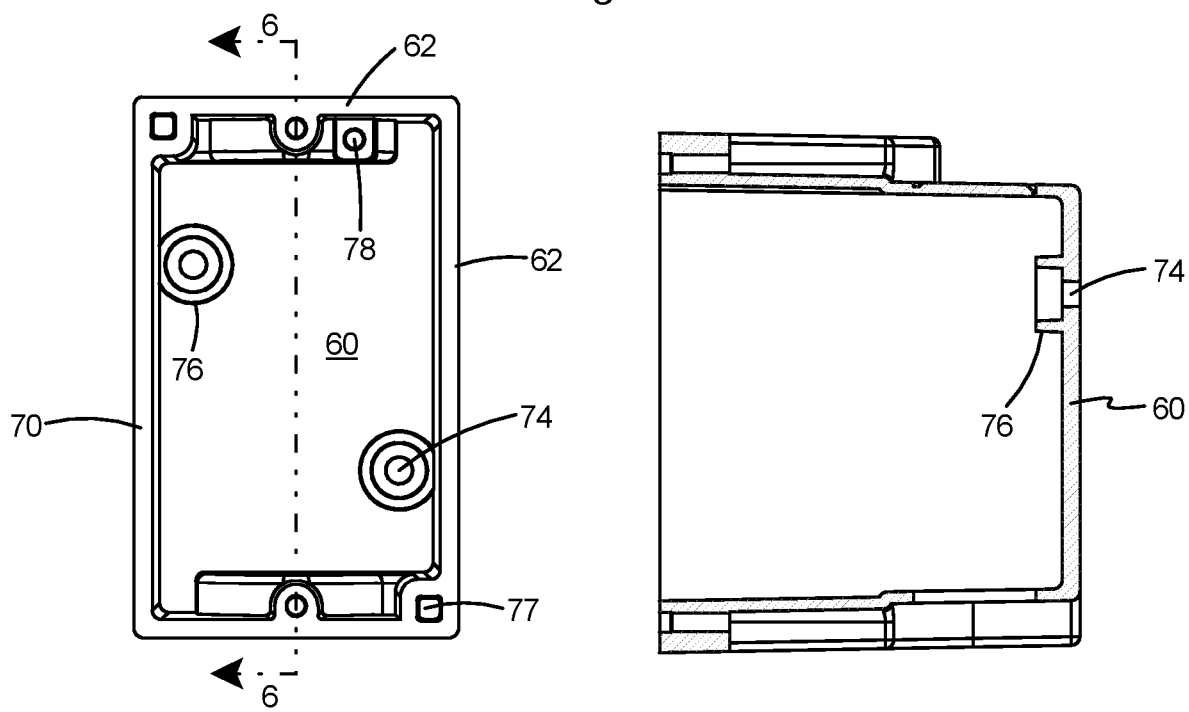
Fig. 5
Fig. 6

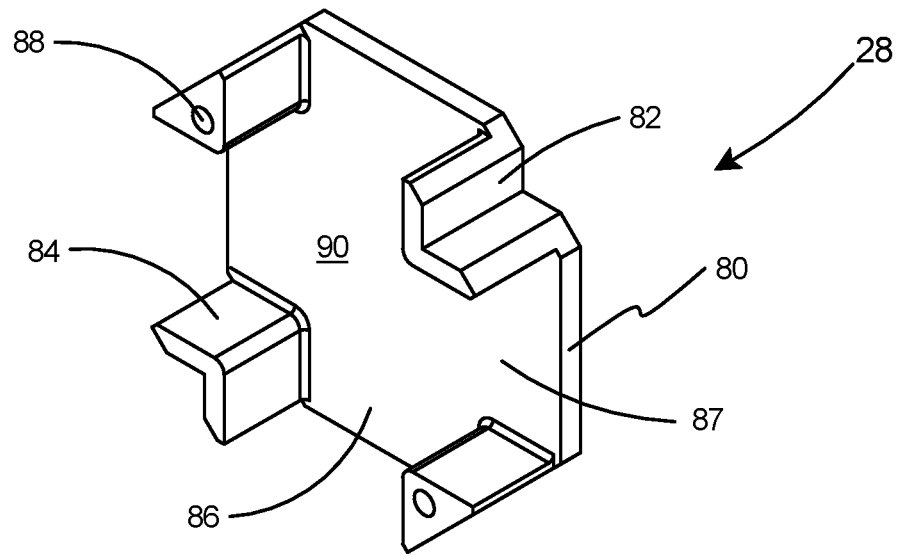
Fig. 7
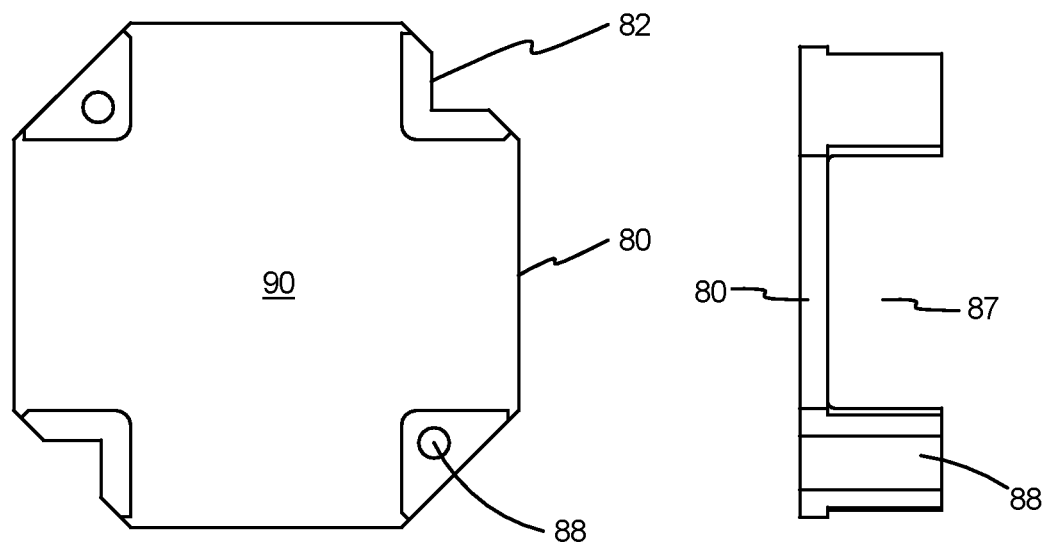
Fig. 8
Fig. 9

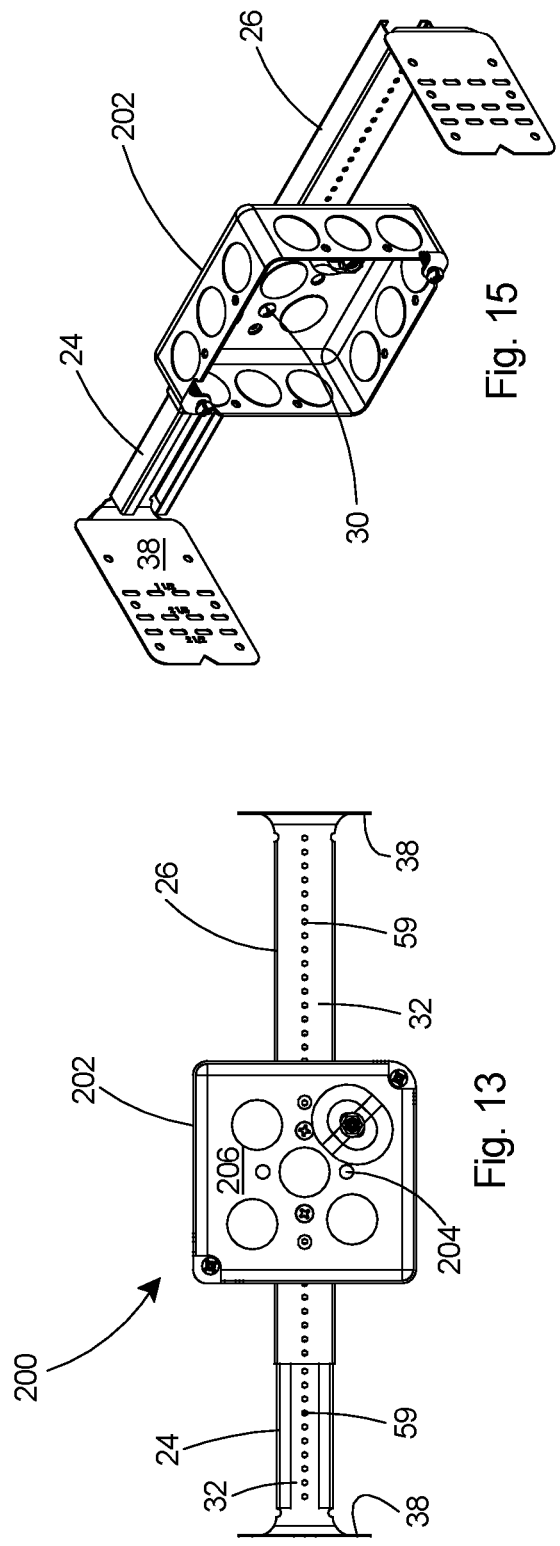
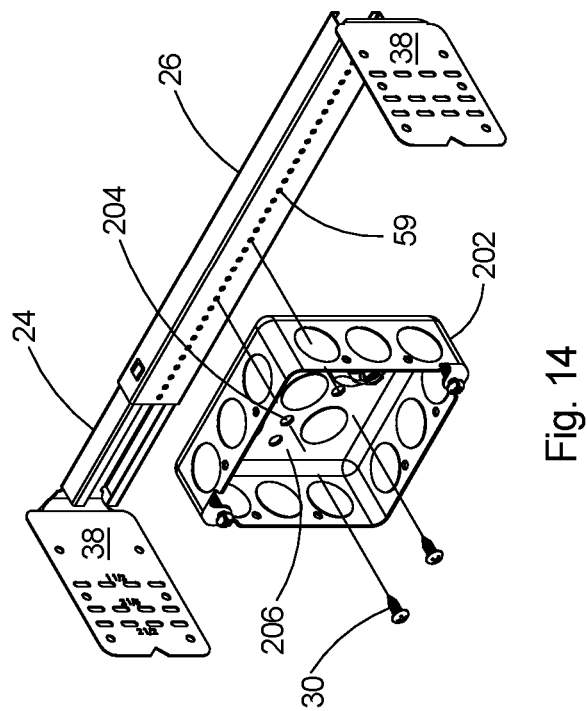
Fig. 13
Fig. 14
Fig. 15

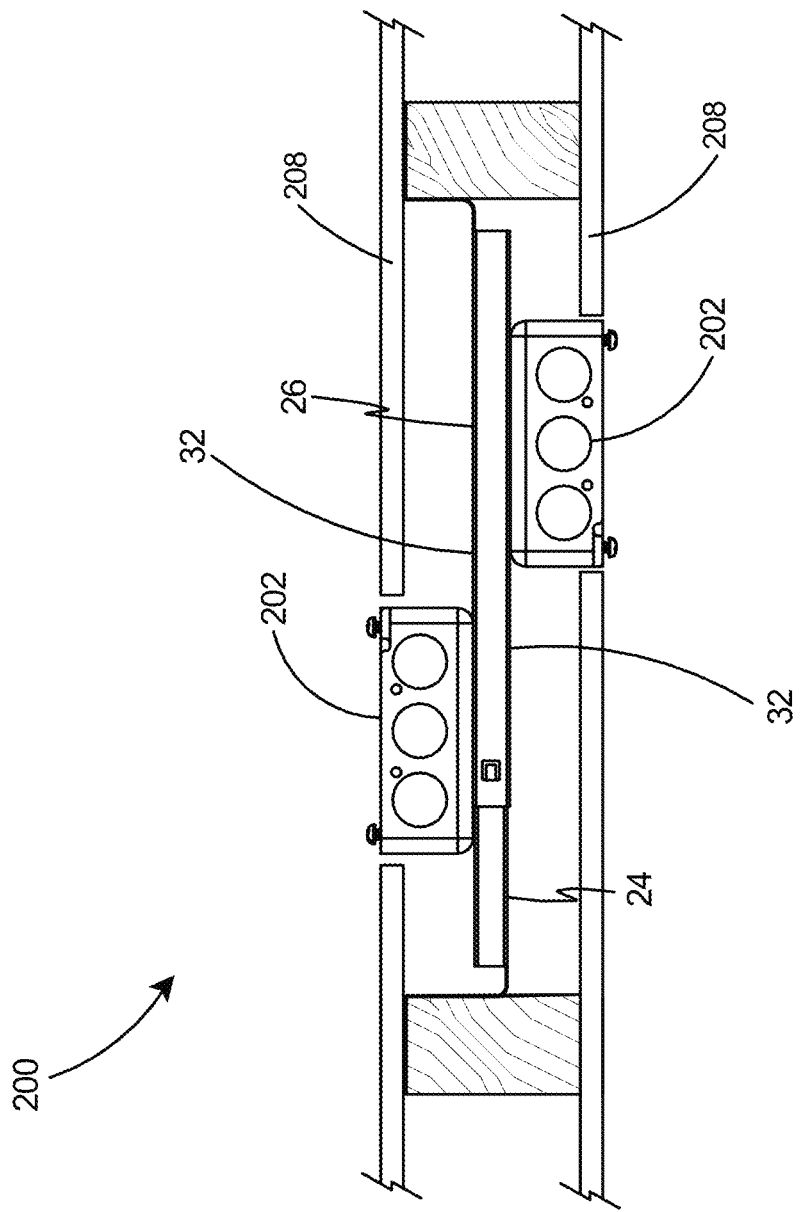

ADJUSTABLE SLIDER BAR FOR MOUNTING AN ELECTRICAL BOX

This application is a continuation-in-part of U.S. Patent Application No. 63/143,352, filed January, 2021.

FIELD OF THE TECHNOLOGY

The invention relates generally to electrical boxes for mounting electrical components to a wall or similar structure. In particular, the invention relates to a slider bar for mounting a single or multi gang electrical box between wood or metal studs with non-standard spacing.

BACKGROUND

Electrical boxes are typically mounted with screws, nails, or similar fasteners to the studs of a structure to provide a rigid, stable box for mounting an electrical component, such as a duplex outlet, switch, or similar component. The mounting procedure is fairly straightforward for standard-size stud spacing. Unfortunately, non-standard stud spacing is frequently encountered, forcing the installer to cut and nail extra 2×4s between the studs, which is time consuming and expensive.

Accordingly, it would be beneficial to provide a device and method for simplifying the installation of electrical boxes between studs that are within non-standard spaced studs.

BRIEF SUMMARY OF THE INVENTION

To address the foregoing needs, Applicant has invented a slider bar that may be adjusted to fit between studs spaced 12 to 18 inches apart and enables an installer to easily and rapidly position one or multiple boxes where they are needed in the stud cavity. The slider bar provides a stable mounting platform between the studs and eliminates the need to cut and nail extra 2×4s within the stud cavity. Pre-formed holes in the bar make for easy attachment of electrical boxes. An interlocking tab stop prevents accidental disassembly. Bending guides on bracket ends assure proper positioning on studs. The slider bar may be used to mount one or more plastic boxes rated for non-metallic (NM) cable, or to mount one or more conventional metal electrical boxes rated for NM, MC, AC, and FMC cable.

BRIEF DESCRIPTION OF THE SEVERAL VIEWS OF THE DRAWING(S)

Reference is made herein to the accompanying drawings, which are not necessarily drawn to scale, and wherein:

FIG. 2 is an isometric view of an inner mounting bar that forms a portion of the adjustable slider bar according to the invention.

FIG. 3 is an isometric view of an outer mounting bar that forms a portion of the adjustable slider bar.

FIG. 4 is a front isometric view of a single gang electrical box that forms a portion of the adjustable slider bar of the invention.

FIG. 5 is a front elevation view of the electrical box.

FIG. 6 is a sectional view of the electrical box taken along line 6-6 of FIG. 5.

FIG. 7 is an isometric view of a slider clip that forms a portion of the adjustable slider bar.

FIG. 8 is a front view of the slider clip.

FIG. 9 is a side view of the slider clip.

FIG. 13 is a front elevation view of a third embodiment of an adjustable slider bar in accordance with embodiments of the invention.

FIG. 14 is an isometric view of the adjustable slider bar of FIG. 13 with an electrical box in alignment to be mounted thereto.

FIG. 15 is an isometric view of the second embodiment of the adjustable slider bar with an electrical box mounted thereto.

FIG. 16 is a plan view of adjustable slider bar with two electrical boxes mounted in opposing directions.

DETAILED DESCRIPTION

Figure 1:
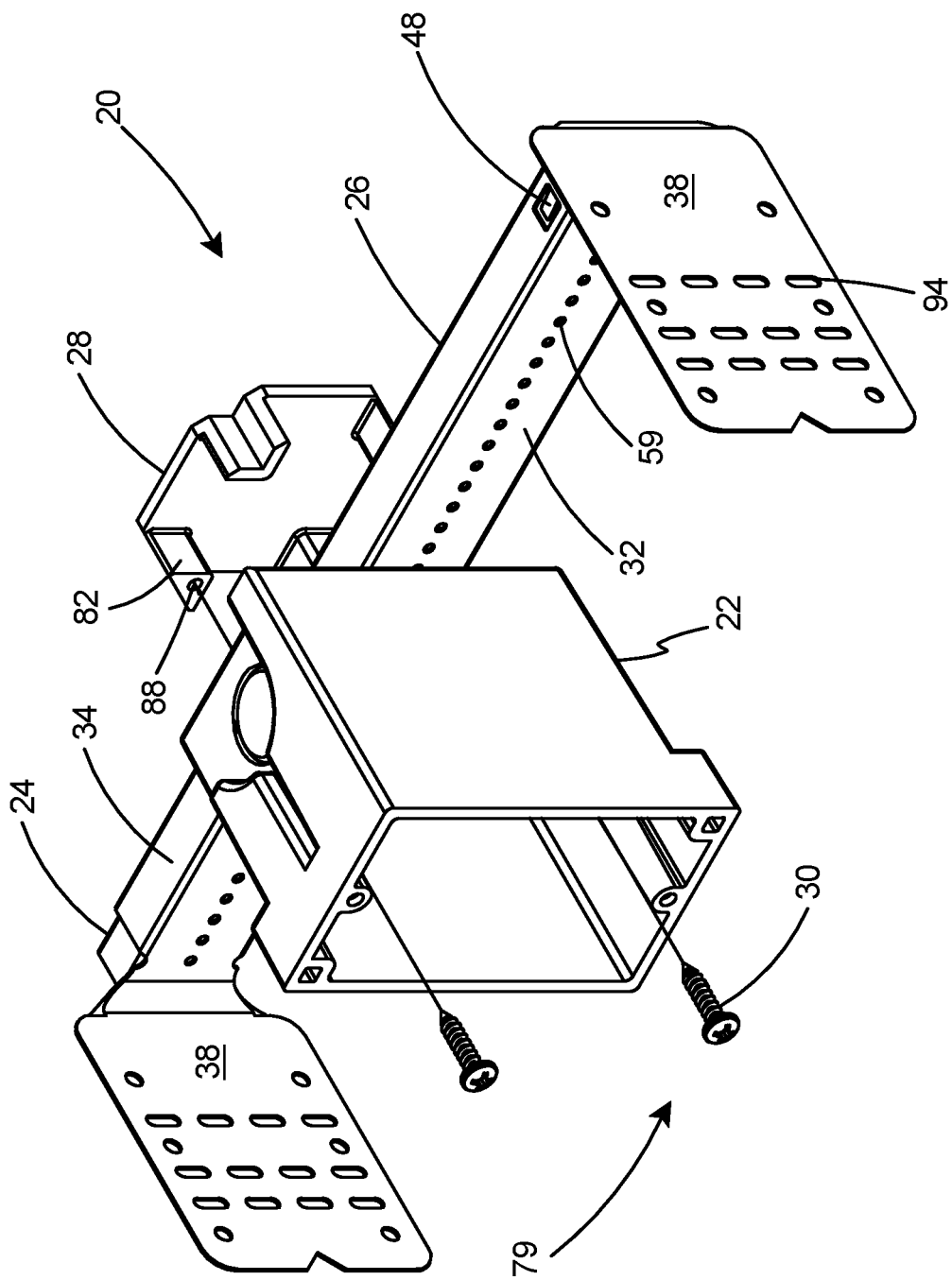
FIG. 1 is an exploded front isometric view of an adjustable slider bar in accordance with embodiments of the invention.

With reference to FIG. 1, the present invention is an adjustable slider bar 20 for mounting a single or two-gang electrical box between two metal or wood studs with standard or non-standard spacing. The slider bar 20 includes an electrical box 22, an elongated inner bar 24, an elongated outer bar 26, a slider clip 28, and box mounting screws 30 for securing the electrical box to the slider bar 20.

Referring to FIG. 2, the inner bar 24 includes a front plate 32, and two side plates 34 with a lip 36 extending therefrom. An end plate 38 extends from one end 40 of the inner bar and the opposing end 42 includes a bore 44 defined by the front plate 32, side plates 34, and lips 36. The lips 36 define an elongated channel 46 there between. The inner bar 24 includes an inner tab stop 48 extending outward from one or more of the side plates 34.

With reference to FIG. 3, the outer bar 26, similar to the inner bar, includes a front plate 32, and two side plates 34 with a lip 36 extending from each side plate. An end plate 38 extends from one end 50 of the outer bar and the opposing end 52 includes a bore 54 defined by the front plate 32, side plates 34, and lips 36. An elongated channel 56 is defined by the lips 36. The outer bar 26 includes an outer tab stop 58 extending inward from one or more of the side plates 34. The front plate 32 of the outer bar 26 includes a plurality of pilot holes 59 axially aligned along the front plate 32 of the outer bar 26.

Referring to FIGS. 4-6, the electrical box 22 includes a rear wall 60 and side walls 62 defining an electrical cavity 63 therein. One or more of the side walls 62 may include a recessed wall portion 64 with a knockout panel 66 therein. The knockout panel 66 may be removed by an electrical installer to provide a knockout aperture for routing electrical cable (not shown) into the box. The recessed wall portion 64 enables the use of a snap-in cable connector (not shown) in the knockout aperture and insuring that the snap-in connector does not extend beyond the side wall 62 of the box. The electrical box 22 includes an open front 68 surrounded by a planar peripheral face 70. The electrical box 22 includes component mounting bosses 72 for mounting of an electrical component. The rear wall 60 includes one or more apertures 74 for passage of screws for securing the electrical box to the slider bar assembly 20. A peripheral wall 76 extends from the rear wall 60 around each aperture 74. Two corner apertures 77 are provided on the peripheral face 70 of the electrical box 22 for pre-installation parking of the mounting screws 30 (see FIG. 1), if such is desired to make the mounting screws handily available for retrieval and use by the installer. A bore 78 is provided within the box for a ground wire clip where such clip is required by the local electrical code.

With reference to FIGS. 7-9, the slider clip 28 includes a back plate 80 and four posts 82 of angular profile that include planar inner surfaces 84 that define intersecting channels 86 and 87 for accommodating the slider bar assembly (not shown). The two intersecting channels 86 and 87 preferably intersect at a 90° angle. Bores 88 in one or more of the posts 82 will accommodate screws (not shown) therein for securing an electrical box to the slider bar assembly. Back plate 80 includes a base plate.

As shown in FIG. 1, the adjustable slider bar 20 includes a fastening arrangement 79 for securing the electrical box 22 to the telescoping bars 24 and 26, wherein the fastening arrangement 79 includes one or more fasteners 30 for extending through the apertures 74 (see FIG. 5) in the back wall 60 of the electrical box and into one or more bores 88 in the posts 82 of the slider clip 28.

Figure 10:
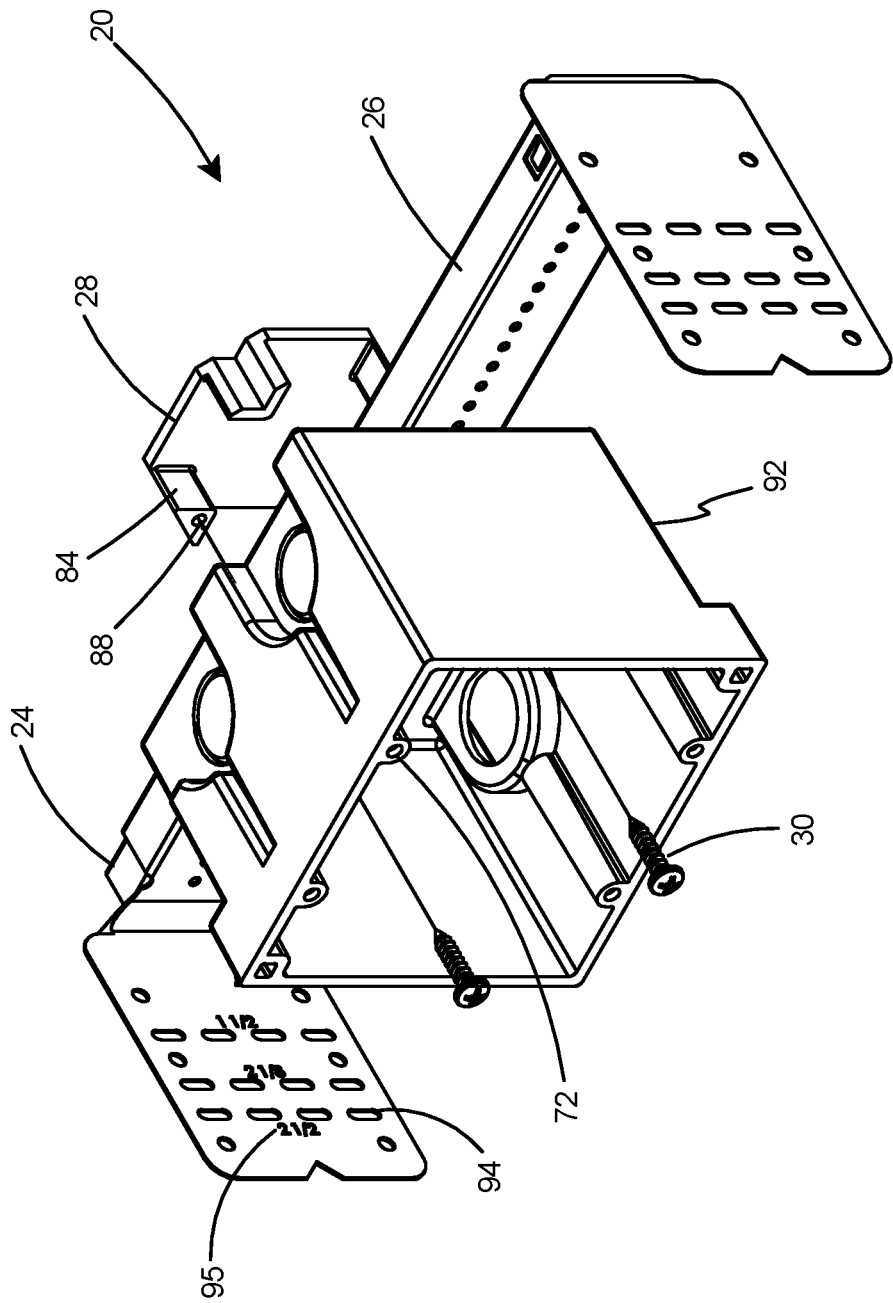
FIG. 10 is a front isometric view of a second embodiment of an adjustable slider bar in which the electrical box is a two gang box.

Referring to FIG. 10, a second embodiment of the adjustable slider bar 20 can accommodate a multi gang electrical box 92 between two metal or wood studs with standard or non-standard spacing. The two telescoping slider bars 24 and 26 can be adjusted to the correct width between two studs and secured thereto, after which the two-gang box 92 can be secured to the slider bar assembly with the slider clip 28. A series of bend lines 94 are provided at various locations on the end plates 38 of each slider bar 24 and 26. The end plates 38 can be bent outward at any selected series of bend lines 94 to enable attachment to the front face of a stud. Each specific bend line 94 includes indicia 95 to indicate the distance of the bend line from the front plate 32 of the outer bar 26. Each bend line 94 is defined by a plurality of slots 96 aligned linearly across the end plates 38. The end plates can be bent at any selected bend line 94 to provide a front flange for securing the adjustable slider bar between two studs.

Figure 11:
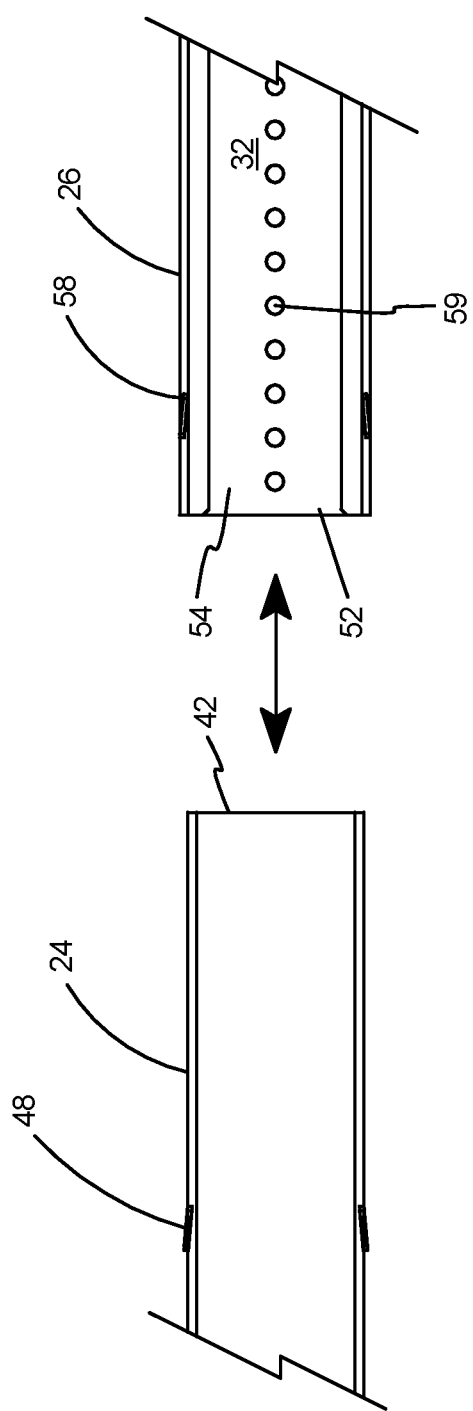
FIG. 11 is a front elevation view showing alignment and assembly of the inner bar to the outer bar to form the bar assembly of the slider bar.

Referring to FIG. 11, the inner bar 24 and outer bar 26 are joined together by sliding the inner bar 24 within the bore 54 of the outer bar 26 to form a slider bar assembly according to the invention. The pre-formed pilot holes 59 in the outer bar 26 enable mounting of one or more conventional metal boxes (not shown) to the slider bar assembly 20. The inner bar 24 includes an inner tab stop 48 extending outward from one or more of the side plates 34. The front plate 32 of the outer bar 26 includes a plurality of pilot holes 59 axially aligned along the front plate 32. After inner tab stop 48 of inner bar 24 is advanced beyond the outer tab stop 58 of outer bar 26, the inner tab stop 48 and outer tab stop 58 form an interlocking tab stop that prevents accidental disassembly of the slider bar assembly, such as for shipment and storage.

Figure 12:
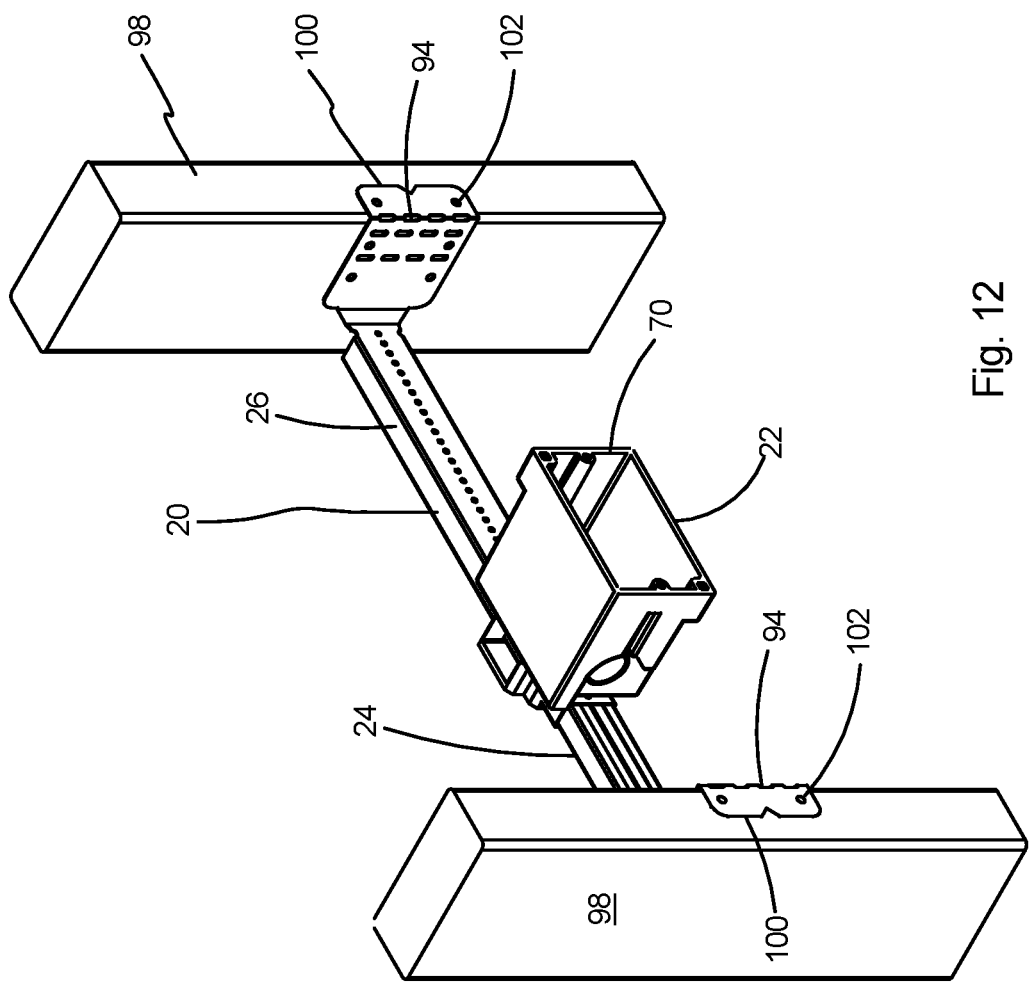
FIG. 12 is an isometric view of an adjustable slider bar secured between two studs with an electrical box mounted horizontally to the slider bar.

With reference to FIG. 12, there is shown an adjustable slider bar 20 secured between two studs 98 with an electrical box 22 mounted to the slider bar in a horizontal orientation. FIG. 12 depicts the slider bars 24 and 26 bent at the first bend line 94 to form a flange 100 for attachment to the studs 98 by fasteners 102. Bending at the first bend line will position the peripheral face 70 of the electrical box ½-inch from the eventual drywall surface, thereby accommodating nominal ½-inch drywall. The remaining two bend lines 94 will accommodate thicker nominal drywalls or multiple layers of drywall, such as for mounting a conventional metal box to the slider bars in a double-wall fireproof installation.

The invention provides a neat, easy way to mount a single or two-gang box between wood or metal studs with either standard or non-standard spacing, and is estimated to save about 20 minutes installation time per electrical box. The slider bar assembly is adjustable to fit between studs spaced 12 to 18 inches apart, and allows an installer to position one or multiple boxes where they are needed in the stud cavity. The slider bar eliminates the need to install additional framing members between the studs in order to properly support and brace the box. Bending guides on the end plate 38 assure proper positioning on the studs.

Most preferably, the slider bars 24 and 26 are constructed of steel. Preferably, the electrical box 22 and slider clip 28 are each molded in one-piece of plastic. The plastic boxes are rated for NM (non-metallic) cable, NMB-PCS, and NMD90 in Canada. Boxes can be mounted either horizontally or vertically on the slider bar.

With reference to FIGS. 13-16, a third embodiment of the adjustable slider bar 200 includes an inner bar 24 and outer bar 26 for mounting a standard 1½" deep, 4" square metal box 202. One advantage of the second embodiment of the adjustable slider bar 200 is that a slider clip is not required for mounting the box 202 to the slider bar 200. As shown in FIG. 13, both the inner bar 24 and outer bar 26 include a plurality of pilot holes 59 axially aligned along the front plate 32 of the respective bars 24 and 26. The slider bar assembly 200 may be adjusted to the proper length to span between a pair of studs (not shown) and secured to the studs with fasteners through the end plates 38. An electrical box 202 may be mounted at any desired location along the length of the bars. The standard 1½" deep, 4" square metal box 202 includes mounting apertures 204 in the back wall 206 of the box. As shown in FIG. 14, the box 202 may be mounted to the adjustable slider bar 200 with fasteners driven directly into the mounting apertures 204 in the back wall 206 of the box. After attachment of the adjustable slider bar 200 to the studs and attachment of the box 202 to either of the bars, the electrical box is securely mounted between the studs.

Referring to FIG. 16, another advantage of the second embodiment of the adjustable slider bar 200 is that a plurality of electrical boxes 202 can be mounted to the front plates 32 of the slider bar and the boxes can be mounted in opposing directions. Both the inner bar 24 and outer bar 26 will accommodate one or more electrical boxes 202. Thus, with bending of the end plates 38 at the proper bend line, the planar peripheral face 70 of each box 202 can be mounted flush with the outer surface of the drywall 208.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. An adjustable slider bar for securing electrical boxes between two studs, comprising:
    an elongated inner bar and an elongated outer bar each including a first end and a second end;

said inner bar telescopically engaged within said outer bar at said second ends;

an end plate on said first ends of said bars;

said bars each including a front plate and two side plates;

a plurality of axially aligned pilot holes in said front plate of said outer bar and in said front plate of said inner bar;

said front plate of said outer bar facing in a first direction the adjustable slider bar and said front plate of said inner bar facing in an opposite direction from the adjustable slider bar;

a lip extending from said side plates of said inner and outer bars, said lips forming an open channel in each of said inner and outer bars;

said axially aligned pilot holes in each of said front plates of said telescopically engaged bars are aligned with one of said open channels;

said electrical boxes include open fronts; and whereby said electrical boxes may be secured in direct contact to said front plate of said inner bar and said front plate of said outer bar to position said open fronts of said electrical boxes face in opposing directions from the slider plate.

2. The adjustable slider bar of claim 1, wherein each of said electrical boxes comprise:

a side wall and a back wall defining a cavity therein;

said open front providing access to said cavity of said electrical box; and one or more apertures in said back wall of said electrical box.

3. The adjustable slider bar of claim 2, comprising posts on a slider clip;

a fastening arrangement for securing said electrical box to said bars; and said fastening arrangement including one or more fasteners for extending through said apertures in said back wall of said electrical box and into said posts of said slider clip.

4. The adjustable slider bar of claim 3, comprising:

one or more of said electrical boxes secured to said front plate of said inner bar; and one or more of said electrical boxes secured to said front plate of said outer bar, whereby said open fronts of said electrical boxes face in opposing directions.

5. The adjustable slider bar of claim 1, comprising:

one or more bend lines on said end plates; and each of said bend lines are defined by a plurality of slots aligned linearly across said end plates.

6. The adjustable slider bar of claim 1, including an interlocking tab stop comprising:

an inner tab stop extending outward from and longitudinally along said side plate of said inner bar; and an outer tab stop extending outward from and longitudinally along said side plate of said outer bar.

\* \* \* \* \*